Figure 4:
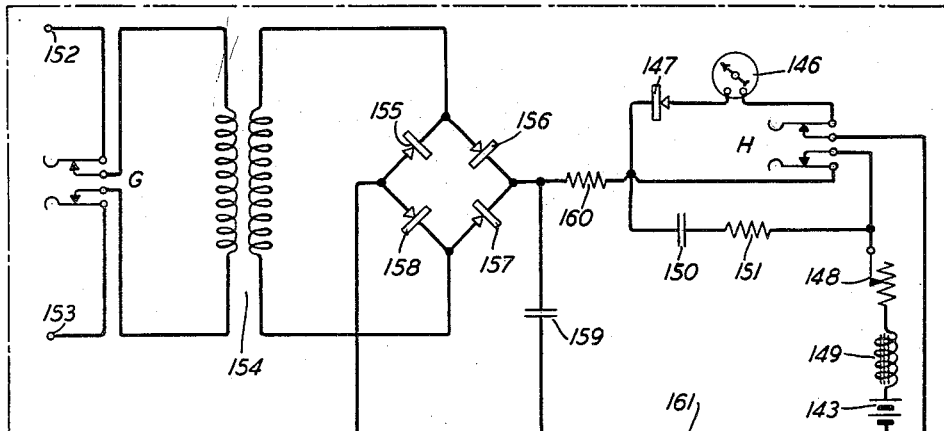

Sept. 12, 1933.  H. C. SILENT ET AL  1,926,887
SOUND RECORDING SYSTEM
Filed April 14, 1932   2 Sheets-Sheet 1
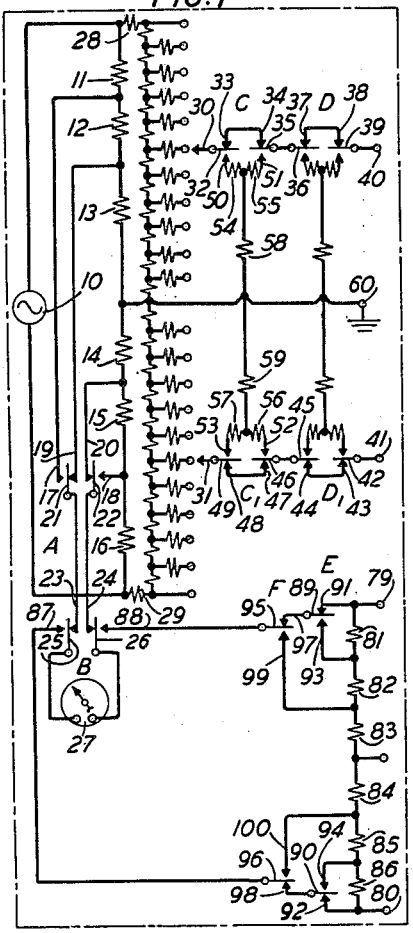
INVENTORS
H.C. SILENT
R. R. SCOVILLE
BY G.H. Heydt
ATTORNEY Sept. 12, 1933.   H. C. SILENT ET AL   1,926,887
SOUND RECORDING SYSTEM
Filed April 14, 1932   2 Sheets-Sheet 2

INVENTORS
H. C. SILENT
R. R. SCOVILLE
BY G. H. Heydt
ATTORNEY

Patented Sept. 12, 1933

1,926,887

UNITED STATES PATENT OFFICE 1,926,887

SOUND RECORDING SYSTEM

Harold C. Silent and Ray R. Scoville, Los Angeles, Calif., assignors to Electrical Research Products, Inc., New York, N. Y., a corporation of Delaware Application April 14, 1932. Serial No. 605,294

3 Claims. (Cl. 179—100.3)

This invention relates to systems for the recording of modulated currents on a photographic film and particularly to recording systems in which a control circuit varies the photographic impression from the center of the characteristic of the recording medium.

The object of the invention is a method and means for adjusting a recording system of this type to attain a predetermined alteration of the point on the characteristic of the recording medium about which the recording is being made, as for effecting a reduction in the noise produced during reproduction, and to record a predetermined amplitude of modulated current without distortion.

In many of the known methods of reproducing modulated currents from a photographic record, the positive print is scanned by a beam of radiant energy which is impressed on an area extending substantially the full width of the record track and of small height lengthwise of the film. The photographic record may vary in transmitting power or may vary in the porportion of transmitting and non-transmitting areas contained in the width of the record track. In either case, the total flux of radiant energy passing through the scanning area to the reproducing device in unit time is varied by the record in accordance with the modulated currents which were impressed originally on the recording device. The beam of radiant energy may take the form of light rays, ultra-violet rays, infra-red rays, an electrostatic flux or an electromagnetic flux.

Three methods of recording modulated currents on a photographic film have become widely used and a detailed description of these methods will show an essential similarity between them. In the first method, which may be termed the "variable area" method, a beam of radiant energy of small height and of constant intensity is directed on a sensitive film and affects a portion of the width of the record track. A recording device actuated by modulated currents causes the beam to affect an area covering more or less of the width of the track. The control of the beam of radiant energy may be effected by various methods such as by reflecting the beam from a mirror associated with the recording device. The mirror is vibrated under the control of the modulated currents and causes a displacement of the beam laterally of the film, or the width of the beam may be defined by physical means, such as a shutter or ribbon in the recording device and the movement of this shutter under the control of the modulated currents causes a variation in the width of the beam laterally of the film. If an area on the record having the dimensions of the scanning area previously described be considered, it will be noted that although the beam of energy is of constant intensity the total energy impressed on the scanning area has varied in accordance with the modulated currents. The total energy impressed in unit time on an area of the material having the same height as the recording beam and extending the full width of the record track may be termed the "recording flux" and the record may thus be said to be produced by a variable recording flux.

In the second method which may be termed the "variable intensity" method a beam of radiant energy of controllable intensity is impressed upon an area of small but constant height lengthwise of the film and of the full width of the record track. Modulated currents cause the intensity of the beam of radiant energy to vary in accordance with the currents, thus varying the exposure of the film and producing a record consisting of lateral striations of varying transmitting power. Thus, in this method the radiant energy impressed in unit time on an area of the record having the same dimensions as the beam of radiant energy has been varied in accordance with the modulated currents. The record is thus also produced by a variable recording flux. The beam of radiant energy may be obtained from a number of known sources, such as an incandescent lamp, an arc lamp, an electric discharge in a partial vacuum or a corona discharge in air.

In the third method which may be termed the "variable time" method a beam of radiant energy of constant intensity is impressed on an area of the film extending the full width of the record track. The height of the area lengthwise of the film affected by the beam is controllably defined by a recording device having an edge or edges movable lengthwise of the film. The time of exposure of the film will vary directly with the height of the area defined by the recording device. Modulated currents are applied to the recording device and cause the height of the recording area to vary in accordance with the modulated currents. If the radiant energy impressed on an area of the record having the dimensions of a scanning area, as previously defined, is considered, it will be noted that the recording flux impressed on this area in unit time has varied in accordance with the modulated currents. The recording device may have a number of forms such as an electromagnetic device, comprising a pair of shutters or ribbons vibrating in accordance with the modulated waves, or an electrostatic device in which a ribbon is caused to vibrate by the electrostatic effect of the modulated currents.

A similar analysis of many other methods of recording will show that the recording device causes a variation in accordance with the modulated currents in a radiant flux falling in unit time on an area of the film having the dimensions of the scanning area. In previously known methods of recording and in the absence of modulated currents, a mean value of flux is impressed on the recording area. When modulated currents are applied to the recording device the actual flux is varied above and below this mean value. The modulated current which may be reproduced by scanning a positive print of a record of this type may be shown to be proportional to the mean value of the recording flux multiplied by the percentage variation of this mean value caused by the modulated waves. Now, for low amplitudes of the modulated currents, if the mean value of the flux be reduced while maintaining the variation in the flux at the same absolute value, the current produced by the reproduction of a positive print will be unchanged because the percentage variation of the mean value of the flux has increased proportionately as the mean value was reduced.

Recent experiments have shown that the noise currents produced during the reproduction of a positive print of a film record are reduced when the mean value of the recording flux is controlled to be at all times as small as possible. Thus, to obtain a maximum reduction of the noise currents produced during the reproduction of the record, when the amplitude of the modulated currents is zero, the mean value of the recording flux should also be zero. From a practical point of view, however, in the variable intensity and variable time methods, if the recording flux is reduced to a very small value the resulting exposure on the negative film will be outside the range of correct exposure and photographic distortion of the record will be produced. In accordance with the present invention, the recording flux is adjusted so that when the amplitude of the modulated currents is zero, a resulting exposure is impressed on the film which is not less than the lower limit of the region of correct exposure for the negative emulsion used. Similarly, in the variable area method for practical reasons the exposed area can not be reduced to zero, thus the recording flux is adjusted so that when the amplitude of the modulated currents is zero a small width of the record track is exposed to the recording flux.

In the present invention a control circuit actuated by the modulated currents controls the recording device so that the mean value of the recording flux is caused to vary with the envelope of the amplitude variations of the modulated currents. The control circuit may be operated to produce what may be termed a direct control or an indirect control of the recording device. In both types of control circuit a unidirectional current or voltage, which may be termed "a static bias", is applied to the recording device to cause the recording device to reduce the mean value of the recording flux below the value which will give the device the maximum carrying capacity. A portion of the modulated currents is amplified, detected, and filtered in the control circuit to produce a filtered current or voltage which varies with the envelope of the amplitude variations of the modulated currents. The filter in the control circuit may be designed so that the filtered voltage or current will vary with the envelope of any desired characteristic of the modulated currents such as the envelope of the average, root-mean-square, or peak amplitudes, though a variation with the peak amplitude of the modulated currents is generally preferable. In a direct control circuit the "static bias" is directly controlled by some device in the control circuit, the impedance of which varies with the value of the filtered current or voltage. In an indirect control circuit the filtered current or voltage, which may be termed the "dynamic bias", is applied to the recording circuit in such direction as to oppose the effect of the static bias on the recording device. Either type of control circuit will produce essentially the same effect on the recording flux.

In accordance with the present invention, with the recording device in the condition determined only by its mechanical adjustment and with normal value of the recording flux impressed on the medium, modulated currents are applied to the recording device and the amplitude of the impressed modulating currents increased until the recording flux is fully modulated. The input of modulated currents is then reduced by the number of decibels of reduction in transmission desired. This value is determined largely by the characteristics of the recording device and recording medium used and the method of use. A static bias is applied to the recording device and adjusted until the recording flux impressed on the film is reduced to a value such that the reduced input of modulated waves will again produce complete modulation of the recording flux. The recording device is then in a condition of adjustment such that the noise produced in the reproduction of a positive print of the record will be a predetermined number of decibels below the normal level of reproduced noise.

With the recording flux reduced as described above, the recording system obviously could not record, without distortion, the normal maximum amplitude of the modulated currents. Accordingly, the control circuit is now energized with modulated currents and reduces the effect of the static bias on the recording device so that the mean value of the recording flux may increase with an increase in the amplitude of the modulated currents. The control circuit preferably should operate rapidly enough so that the mean value of the recording flux will increase in exact proportion with an increase in the envelope of the peak amplitudes of the modulated currents. However, the control circuit should not operate rapidly enough to follow the variation of an individual frequency or a distortion of the record will be produced. To avoid such distortion the filter included in the control circuit is designed to have such constants that the recording flux will not vary with an individual frequency. The control circuit is thus comparatively slow in responding to a change in the amplitude of the modulated currents. Thus there is a danger that when the system is recording a wave of moderate amplitude and a wave of large amplitude is suddenly applied to the system, the recording device will be overloaded before the control circuit can operate. To avoid this danger, in accordance with the present invention, the control circuit is adjusted to provide at moderate amplitudes a "margin" between the degree of modulation and the mean value of the recording flux. This margin at any instant may be defined as the ratio of the power required to produce complete modulation of the mean value at that instant of the recording flux divided by the mean power impressed on the recording device, assuming that the mean power has also been impressed on the control circuit for a sufficient time for the control circuit to completely operate. Thus, for very small degrees of modulation, the mean flux will have a fairly small value. As the peak amplitude of the modulated currents increases, the mean flux will increase proportionately. The mean flux will reach its maximum value when the peak amplitude of the modulated currents is a predetermined amount less than the maximum and the mean flux will remain at this value until the peak amplitude of the modulated currents increases to the maximum. In accordance with the present invention, modulated currents are applied to the recording device until with no static or dynamic bias applied to the device, the recording flux is just completely modulated. The input of modulated waves to the recording device is then reduced by the predetermined value of the margin, and the value of static bias determined by the noise reduction adjustment previously described is applied to the recording device. The input of modulated currents to the control circuit is then increased until the mean flux has just been restored to its normal value.

Figure 5:
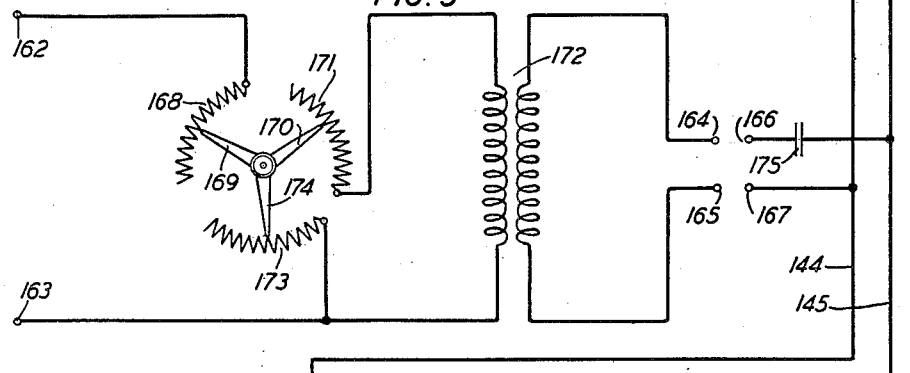

In the drawings:

Fig. 1 schematically represents a test oscillator and control network;

Fig. 2 schematically represents an amplifier for modulated currents;

Fig. 3 schematically represents an amplifier for modulated currents having an input control potentiometer;

Fig. 4 schematically represents a control circuit and a recording device;

Fig. 5 schematically represents an input circuit for modulated currents; and

Figure 6:
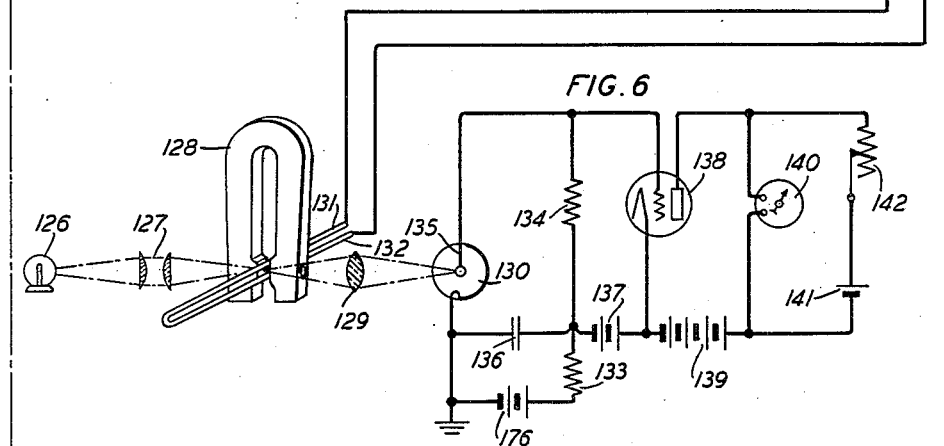

Fig. 6 schematically represents a circuit for measuring the radiant energy passing the recording device.

In Fig. 1 an oscillator 10 supplies alternating current of a suitable frequency, preferably in the range of audible frequencies, to the resistors 11, 12, 13, 14, 15 and 16 in serial relation across the output of the oscillator 10. The junction of resistors 11 and 12 is connected to the make spring 17 of a suitable telephone key or switch A. Similarly, the junction of resistors 15 and 16 is connected to the make spring 18 of the key A. The junction of resistors 12 and 13 is connected to the break spring 19 of the key A; and the junction of the resistors 14 and 15 to the break spring 20. The operating springs 21 and 22 of the key A are respectively connected to the break springs 23 and 24 of the key B. The operating springs 25 and 26 of the key B are connected to a suitable measuring device 27, such as a thermocouple and milliammeter. The reading of the meter will then be a definite fraction of the output of the oscillator. A calibration mark may be placed on the scale of the meter and the output of the oscillator adjusted for all tests to have the meter read on the calibration mark. The output of the oscillator delivered to the resistance network will then be a known quantity for all tests. In some tests, a smaller output from the oscillator is desired than can be conveniently read on the meter. The key A is operated and disconnects operating spring 21 from break spring 19 and connects operating spring 21 to make spring 17 while simultaneously it disconnects operating spring 22 from break spring 20 and connects operating spring 22 to make spring 18. A larger proportion of the output of the oscillator 10 is thus supplied to the meter 27. The resistors 11, 12, 13, 14, 15 and 16 may be so proportioned that the operation of the key A is equivalent to a known increase in the output of the oscillator which may be expressed as a definite number of decibels above an arbitrary zero power. The zero level of power may conveniently be taken as six milliwatts. The resistances may be calculated as indicated in an article by W. F. Lanterman "The design of attenuation networks" in Electronics, February 1931, page 508, published by the McGraw-Hill Company, New York.

The output of the oscillator 10 is applied through resistors 28 and 29 to a balanced constant impedance potentiometer of known type, consisting of shunt and series resistance elements. A simultaneous movement of the sliders 30 and 31 outward will increase the voltage from the oscillator supplied to the test circuit in a known predetermined ratio, which may conveniently be expressed in decibels. A variation of one decibel per step has been found to be generally convenient.

Current may flow from the oscillator 10 through the control network to slider 30 through operating spring 32, break spring 33, break spring 34 and operating spring 35 of key C, thence through operating spring 36, break spring 37, break spring 38 and operating spring 39 of key D to terminal 40, thence through the circuit to be tested, terminal 41, operating spring 42, break spring 43, break spring 44 and operating spring 45 of key $D_1$, thence through operating spring 46, break spring 47, break spring 48 and operating spring 49 of key $C_1$, to the slider 31, and through the control network to the oscillator 10.

The operating springs 32 and 35 of key C and the operating springs 46 and 49 of key $C_1$ may conveniently be arranged so that they are all operated by a single lever. When such a lever is operated, operating spring 32 is disconnected from break spring 33 and connected to make spring 50; operating spring 35 is disconnected from break spring 34 and connected to make spring 51; operating spring 46 is disconnected from break spring 47 and connected to make spring 52; and operating spring 49 is disconnected from break spring 48 and connected to make spring 53. The result of this switching operation will be to insert resistors 54 and 55 in series in the circuit from slider 30 to terminal 40; to insert resistors 56 and 57 in series in the circuit from terminal 41 to slider 31; and to bridge resistors 58 and 59 across the line. The insertion of a balanced H type network of this type into the line will reduce the input to the circuit under test a predetermined number of decibels. For example, when working between terminal impedances of 500 ohms each, to produce a loss of 10 decibels, the series resistances may be 130 ohms and the shunt resistances may each be 175 ohms.

The operating springs 36 and 39 of key D and the operating springs 42 and 45 of key $D_1$ may similarly be arranged so that they are all operated by a single lever and insert into the line a second balanced H type network which may conveniently cause an attenuation of six decibels.

The junction of resistors 13 and 14, the center of the balanced potentiometer and the junction of the shunt resistors 58 and 59 may be connected to ground at terminal 60.

In Fig. 2 power from a battery 61 is supplied through a variable resistor 62 and inductor 63 to energize the cathodes 64 and 65 of two thermionic amplifiers 66 and 67. Power from a battery 68 is supplied through an inductor 69 to a tap on the primary winding of the transformer 70, and there divides and flows to the anodes of the amplifiers 66 and 67, through the amplifiers 66 and 67 to their cathodes 64 and 65 back to battery 68. A source of potential 71 is connected between the cathodes 64 and 65 of the amplifiers 66 and 67 and a tap on the secondary winding of the transformer 72 and causes the control electrodes of the amplifiers 66 and 67 to be at a potential more negative than any part of the cathodes 64 and 65.

A modulated voltage applied between the terminals 73 and 74 of the transformer 72 will be applied to the control electrodes of the amplifiers 66 and 67 and will cause the current flowing in the primary winding of transformer 70 to be varied accordingly. An amplified voltage will thus be developed across the terminals 75 and 76 of the secondary winding of transformer 70, and across the terminals 77 and 78, respectively, connected in parallel with the terminals 75 and 76.

The test oscillator shown in Fig. 1 may be conveniently used to measure and check the amplifying power of an amplifier such as the amplifier shown in Fig. 2. Terminals 40 and 41 of Fig. 1 are connected, respectively, to terminals 73 and 74 of Fig. 2. Terminals 77 and 78 of Fig. 2 are connected, respectively, to terminals 79 and 80 of Fig. 1. The output of the amplifier will then flow through the resistors 81, 82, 83, 84, 85 and 86. Key B may be operated to disconnect the operating springs 25 and 26, respectively, from the break springs 23 and 24 and to connect the operating springs 25 and 26, respectively, to the make springs 87 and 88. The meter 27 will then read the voltage developed across the resistors connected between the terminals 79 and 80.

The output of the amplifier will be larger than the input so that, when the meter 27 is connected directly to the terminals 79 and 80, the meter 27 will read very much higher than when the meter 27 is connected to the input network. In such a condition, key E or F may be operated. When key E is operated, the operating springs 89 and 90 are simultaneously disconnected from their respective break springs 91 and 92 and simultaneously connected to their respective make springs 93 and 94. The voltage applied to the meter 27 will now be a definite fraction of the total voltage developed between the terminals 79 and 80 and, being a ratio, may be expressed in decibels. If the number of decibels of reduction in the voltage applied to the meter 27 is exactly equal to the number of decibels of gain in the amplifier under test, the meter 27 will give the same reading for both positions of the key B. If the gain of the amplifier under test is rather high, key F may be operated, the operating springs 95 and 96 are simultaneously disconnected from their respective break springs 97 and 98 and are simultaneously connected to their respective make springs 99 and 100. The voltage applied to the meter 27 is then a much smaller fraction of the voltage developed across the terminals 79 and 80.

In Fig. 3 a two-stage amplifier is disclosed consisting of a controllable single stage amplifier combined with a push-pull amplifier similar to the amplifier disclosed in Fig. 2. A modulated voltage applied across the terminals 101 and 102 of the transformer 103 will cause a current to flow in the resistors 104 and 105 connected in serial relation across the secondary winding of the transformer 103. The voltage developed across the resistor 105 causes a current to flow through contact 106, switch blade 107 and resistor 108. A controllable portion of the voltage developed in the resistor 108 is applied by the slider 109 between the control electrode and cathode of a thermionic amplifier 110. By moving the slider 109 upward, the voltage applied to the control electrode increases until the slider 109 is at the upper end of resistor 108 and the full voltage developed across the resistor 105 is applied to the control electrode. The resistor 108 is arranged in circular form so that further movement of the slider 109 will bring the slider in contact with the lower end of resistor 108. Simultaneously, the switch blade 107 is moved from contact 106 to contact 111 and switch blade 112 is moved off contact 113. The full voltage developed across both resistors 104 and 105 is now applied to resistor 108. Further movement of the slider 109 upward will increase the voltage applied to the control electrode until the full voltage developed by the secondary winding of transformer 103 is applied to the control electrode. A very wide variation of the modulated voltage applied to the control electrode of the amplifier 110 may thus be attained.

Power is supplied from a battery 114 through a variable resistor 115 and inductor 116 to energize the cathode of the thermionic amplifier 110. A battery 117 applies a potential through the resistor 108 to the control electrode of the amplifier 110 to give the control electrode a negative polarity with respect to the cathode. A battery 118 supplies power through a resistor 119 in parallel relation with the primary winding of a transformer 120 to the anode of the amplifier 110, thence through the amplifier to its cathode and back to battery 118. The resistor 119 reduces the amount of current flowing in the secondary winding of the transformer 120 and causes the amplification to be substantially uniform over a wide frequency range.

The output of the amplifier 110 is applied through the transformer 120 to two thermionic amplifiers 121 and 122 in push-pull relation and the amplified output of the amplifiers 121 and 122 is applied through the transformer 123 to the terminals 124 and 125. As the operation of the push-pull stage formed by the amplifiers 121 and 122 is practically identical with the operation of the push-pull stage formed by the amplifiers 66 and 67 in Fig. 2, a detailed description of the operation is not necessary.

Fig. 6 diagrammatically illustrates a sound recording system of the variable time type and a measuring circuit. While for convenience, a particular type of recording device has been illustrated, the invention is not limited to the device shown and any known type of recording device may be used.

Radiant energy from a suitable source 126 is focused by a lens system 127 on aligned small orifices in the pole pieces of a magnet 128. The radiant energy emerging from the orifices is normally focused by the lens system 129 on a moving film. For the purposes of this invention, the moving film may be replaced by a light sensitive device 130, such as a photocell. A pair of ribbons 131 and 132, which may be parts of one single ribbon, are immersed in the magnetic field of the magnet 128 and aligned with the orifices pierced in the pole pieces of the magnet 128 to define a small light transmitting slot. When an electric current flows in the ribbons 131 and 132, the reaction of the magnetic field formed by the current in the ribbons with the magnetic field of the magnet 128 will cause the ribbons 131 and 132 to be displaced in opposite directions increasing or decreasing the height of the slot lengthwise of the film and thus varying the time of exposure or from another viewpoint, the variation in the height of the slot varies the total flux of radiant energy passing through the slot.

A battery 176 impresses a potential through the resistors 133 and 134 on the anode 135 of the photocell 130. When radiant energy passes through the slot formed by the ribbons 131 and 132 and falls on the cathode of the photocell 130, electrons will be emitted and will be drawn to the anode 135 and will flow through the resistors 134 and 133 and battery 176 back to the cathode, causing a difference of potential between the ends of the resistor 134. A large capacitor 136 permits the variable currents to return to the cathode.

The potential difference between the ends of the resistor 134 in series with a battery 137 is impressed between the control electrode and the cathode of a thermionic triode 138. The cathode of the triode 138 is suitably energized. Current flows from battery 139 through a meter 140 to the anode of the triode 138, thence through the triode 138 to battery 139. When the photocell 130 is dark, the steady current flowing through the meter 140 is balanced by a current flowing from battery 141, through variable resistor 142 and meter 140 back to battery 141. As the anode current is thus balanced out, the meter 140 may be a sensitive milliammeter or microammeter.

When a modulated current of symmetrical wave form and moderate amplitude is impressed on the ribbons 131 and 132, the radiant energy falling on the photocell 130 will vary symmetrically above and below its mean value and will cause the current flowing in the meter 140 similarly to vary symmetrically above and below its mean value. If the rate of variation is moderately high, the meter 140 will not be affected by the variation. However, if the amplitude of the modulated current is increased, the ribbons 131 and 132 will vibrate with sufficient amplitude that they will clash or touch at their extreme inner position. The ribbons 131 and 132 are, however, free to oscillate to the extreme outer position. Thus when the ribbons 131 and 132 are clashing, the radiant energy falling on the photocell 130, no longer varies symmetrically above and below its mean value and the variation in the current flowing in the meter 140 is no longer symmetrical. The currents flowing in the meter 140 will no longer be balanced and the meter 140 will read the unbalanced current. Thus the meter 140 will indicate when the current applied to the ribbons 131 and 132 is sufficient to overload the light valve and cause the ribbons 131 and 132 to clash.

In Fig. 4 current from battery 143 flows through wire 144, ribbon 131, ribbon 132, wire 145, springs of key H, meter 146, rectifier 147, springs of key H, variable resistor 148, inductor 149 to battery 143. A capacitor 150 and resistor 151 bridged across the springs of key H will absorb the spark formed when the key is operated. By means of the variable resistor 148, the current may be adjusted so that the ribbons 131 and 132 are drawn very close together.

A modulated current applied to the terminals 152 and 153 will flow through the springs of key G and the primary winding of transformer 154. The current induced in the secondary winding of transformer 154 will be rectified by the double wave rectifier formed of the four bridge connected elements 155, 156, 157 and 158 and will charge the capacitor 159. When the amplitude of the current decreases, the capacitor 159 will discharge through resistor 160, springs of key H, resistor 148, reactor 149, battery 143 and wire 161. The discharge current from the capacitor 159 will reduce the effect of the current from the battery 143 on the ribbons 131 and 132 but, due to the rectifier 147 can not reverse the current in the ribbons 131 and 132. The resistors 160 and 148 in the discharge path of the capacitor 159 will cause the current flowing in the ribbons 131 and 132 to vary with the envelope of the amplitude variations of modulated current.

In order to secure consistent results in the adjustment of a recording equipment of this character, the gain of the amplifiers should be measured at regular intervals. As previously described, the gain of the amplifier shown in Fig. 2 may be checked by connecting terminals 73 and 74 of Fig. 2, respectively, to terminals 40 and 41 of Fig. 1 and by connecting terminals 77 and 78 of Fig. 2, respectively, to terminals 79 and 80 of Fig. 1. The gain may then be measured as previously described. The connections are then removed and the amplifier shown in Fig. 3 is tested by connecting terminals 101 and 102 in Fig. 3, respectively, to terminals 40 and 41 of Fig. 1 and by connecting terminals 124 and 125 of Fig. 3, respectively, to terminals 79 and 80 of Fig. 1. The gain of the amplifier shown in Fig. 3 may then be measured for any desired position of the slider 109.

Terminals 40 and 41 of Fig. 1 are then connected, respectively, to terminals 73 and 74 of Fig. 2. Terminals 75 and 76 of Fig. 2 are connected, respectively, to terminals 101 and 102 of Fig. 3. Terminals 124 and 125 of Fig. 3 are connected, respectively, to terminals 152 and 153 of Fig. 4. Terminals 77 and 78 of Fig. 2 are connected, respectively, to terminals 162 and 163 of Fig. 5. Terminals 164 and 165 of Fig. 5 are connected, respectively, to terminals 166 and 167 of Fig. 4.

In Fig. 5 current from terminal 162 will flow through resistor 168, slider 169, slider 170, resistor 171, primary winding of transformer 172 to terminal 163. A part of the current will also be diverted through slider 174 and shunt resistor 173. The combination of resistors 168, 171 and 173 will thus form a constant impedance T-type network having a variable attenuation. The output of the transformer 172 flows through terminals 164 and 166, capacitator 175, wire 145, ribbons 132 and 131, wire 144, terminals 167 and 165 back to transformer 172. The capacitator 175 prevents a steady current from battery 143 from flowing in the winding of transformer 172.

With keys C and D in their normal position as shown in Fig. 1 and with keys G and H in Fig. 4 operated, the input of current from the oscillator 10 is adjusted to some convenient value by moving the sliders 30 and 31 of Fig. 1. The input of modulated current to the ribbons 131 and 132 is then varied by rotating the sliders 169, 170 and 174 of Fig. 5 until the meter 140 in Fig. 6 indicates that the input of modulated current is just sufficient to cause the ribbons 131 and 132 to clash.

Key C is then operated and reduces the input by a definite number of decibels. With present methods of recording and film processing, the attenuation introduced by key C should be of the order of 10 to 15 decibels. The attenuation introduced by the operation of key C is a measure of the reduction in the magnitude of the noise currents which will be obtained in the reproduction of sounds of moderate volume. Key H in Fig. 4 is restored to normal and resistor 148 adjusted to draw the ribbons 131 and 132 together, reducing the carrying capacity of the light valve to such a value that the reduced input is again just sufficient to cause the ribbons 131 and 132 to clash.

Without changing the adjustment of resistor 148, key C is restored, key D is then operated and reduces the input by a predetermined number of decibels below the maximum value. The attenuation introduced by key D is a measure of the ratio between the input power at which the ribbons 131 and 132 are fully opened and the full carrying capacity of the light valve is available, and the maximum input applied to the valve. This margin between the input power applied at any instant and the carrying capacity of the valve at that instant reduces the possibility of the valve being overloaded by a sudden increase in the amplitude of the input current modulating the ribbons 131 and 132 before the control circuit has operated to increase the carrying capacity. Key G in Fig. 4 is operated and the slider 109 in Fig. 3 adjusted until the input to the control circuit in Fig. 4 is increased to a point where the rectified current just neutralizes the effect of the current from the battery 143 and the reading of the meter 146 in Fig. 4 is reduced practically to zero. The circuit is then adjusted for recording sound. The connections to terminals 73 and 74 of Fig. 2 are removed and the terminals connected to a microphone or other sound detector. The test circuit shown in Fig. 6 is removed and the modulated light is impressed on a film moving at constant speed.

What is claimed is:

1. In a system for recording modulated currents on a sensitive material comprising a beam of recording flux affecting said sensitive material, a recording device actuated by said currents to modulate said flux and a biasing circuit to vary the mean value of said flux, the method of adjustment which comprises applying modulated currents to said recording device of such amplitude as to produce substantially complete modulation of the normal value of said flux, reducing the input of modulated currents applied to said recording device to a predetermined fraction of said first value, and adjusting said bias to reduce said flux to a mean value which is substantially completely modulated by said reduced input of modulated currents.

2. In a system for recording modulated currents on a sensitive material comprising a beam of recording flux affecting said material, a recording device actuated by said currents to modulate said flux, a static biasing circuit controlling the mean value of said flux and a dynamic biasing circuit energized by said modulated currents to oppose the effect of said static bias, the method of adjustment which comprises applying modulated currents to said recording device to produce substantially complete modulation of the mean value of said flux as determined by said static bias, reducing the input of modulated currents to said recording device to a predetermined fraction of said first value, and adjusting the input of modulated currents to said dynamic biasing circuit to a value such that the effect of the dynamic bias substantially nullifies the effect of the static bias.

3. In a system for recording modulated currents on a sensitive material comprising a beam of recording flux affecting said sensitive material, a recording device actuated by said currents to modulate said flux, a static biasing circuit controlling the mean value of said flux, and a dynamic biasing circuit opposing the effect of said static bias, the method of adjustment which comprises applying modulated currents to said recording device of such amplitude as to produce substantially complete modulation of the normal value of said flux, reducing the input of modulated currents applied to said recording device to a predetermined fraction of said first value, adjusting the effect of said static bias to a value to reduce said flux to a mean value which is substantially completely modulated by said reduced input of modulated currents, reducing the input of modulated currents to said recording device to a second predetermined fraction of said first value, and adjusting the input of modulated currents to said dynamic biasing circuit to a value such that the effect of said dynamic bias substantially nullifies the effect of said static bias.

HAROLD C. SILENT.
RAY R. SCOVILLE.